United States Patent [19]

Hilbun

[11] Patent Number: 4,768,306
[45] Date of Patent: Sep. 6, 1988

[54] METHOD AND SYSTEM FOR KILLING FIRE ANTS

[76] Inventor: Steve Hilbun, P.O. Box 332, SoSo, Miss. 39480

[21] Appl. No.: 93,665

[22] Filed: Sep. 8, 1987

[51] Int. Cl.⁴ .............................................. A01M 13/00
[52] U.S. Cl. ...................................... 43/125; 43/132.1
[58] Field of Search ...................... 43/132.1, 129, 130, 43/124, 125

[56] References Cited

U.S. PATENT DOCUMENTS

| | | | |
|---|---|---|---|
| 584,484 | 6/1897 | Schindler | 43/125 |
| 3,753,408 | 8/1973 | Zimmerman | 111/7.1 |
| 4,026,330 | 5/1977 | Dunn | 43/124 |
| 4,597,217 | 7/1988 | Narita | 43/124 |
| 4,637,161 | 1/1987 | Turner | 43/132.1 |

Primary Examiner—Gene P. Crosby
Attorney, Agent, or Firm—Edwin E. Greigg

[57] ABSTRACT

A method and device for killing fire ants in a mound comprising a shroud which will fit over the mound and conform to the contour of the ground. The shroud is provided with a relief valve, a tube or hose for admitting an exhaust gas into the shroud and a handle for lifting the device. Exhaust gases directed into the mound and into cavities made by the fire ants will exterminate the ants.

3 Claims, 1 Drawing Sheet

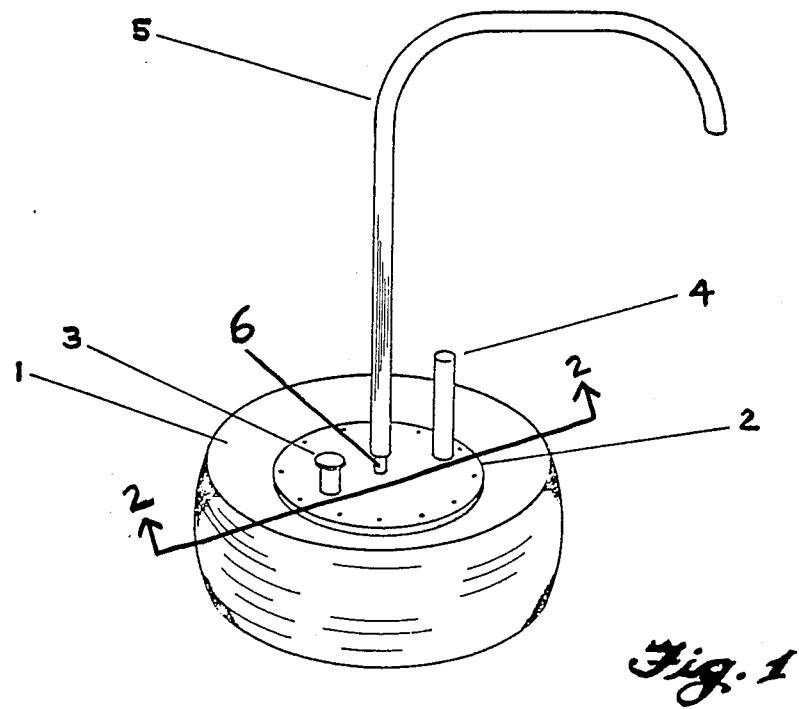
Fig. 1
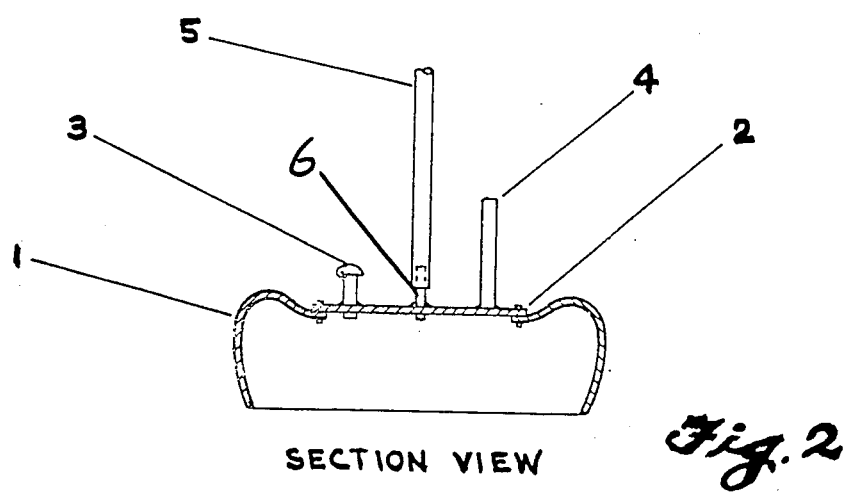
SECTION VIEW  Fig. 2

METHOD AND SYSTEM FOR KILLING FIRE ANTS

BACKGROUND OF THE INVENTION

This invention is directed to a method and device used for killing fire ants in their mound and under ground passages.

Heretofore different methods and systems have been used for killing fire ants. Such sytsems have been set forth in U.S. Pat. Nos. 584,484; 1,403,461; 4,637,161 and 4,640,044.

It is an object of the invention to provide an inexpensive method and system for exterminating fire ants in their normal habitat.

Another object is to provide a flexible hood which will fit over a fire ant mound and will seal against uneven ground for carrying out the method.

Another objective is to provide a non-chemical system to destroy fire ants.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 is a perspective view illustrating the device; and

FIG. 2 is a cross sectional view of the device of of FIG. 1, taken along lines 2—2.

The device includes a flexible rubber or plastic shroud 1 having open upper and lower portions which is suitable to be placed over a fire ant mound and which will seal its bottom surface along uneven ground. A header flange 2 made of a non-flexible material is secured across the upper open end of the shroud and is provided with a pressure relief valve 3. A flexible hose or pipe 5 is secured to an open pipe 6 secured to the header 2. One or more mounting means 4 may be secured to the header for mounting a carrying handle to the header.

In operation, the shroud is placed over a fire ant mound so that the bottom edge of the shroud seals against the ground. The flexible hose is secured to the exhaust pipe of an automobile or other combustion engine so that the exhaust gases will flow into the shroud. The pressure relief valve is set at a pressure such that any back-up of exhaust gases will not affect operation of the engine. The exhaust gases of carbon monoxide injected into the header flows around the fire ant mound and into any of the passages constructed in the ground by the fire ants.

In the event that the engine stops operating because of the back-up of exhaust gases and some fire ants are still alive, the hose can be removed from the exhaust pipe and the engine started. Once the engine has started, the pipe can be placed onto the exhaust pipe for application of carbon monoxide to the fire ants. It has been determined that only a short period of operation will destroy a majority of the ants.

The material from which the shroud header and hose are made is not important so long as the shroud covering follows the contour of the ground upon which it seats to cover the fire ant mound.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method of exterminating fire ants in a fire ant mound in the ground which comprises placing a covering over the fire ant mound with the covering surrounding and conforming to the shape of the area of the ground surrounding the fire ant mound and directing exhaust gases of a combustion engine into the area bound by the covering above the fire ant mound, and permitting any excess exhaust gases above a set pressure to escape from said covering to prevent engine failure.

2. A device for exterminating fire ants in a fire ant mound in the ground surface which comprises a covering made of a pliable material and having an open bottom end of sufficient size to fit over the fire ant mound and which will conform along its bottom surface to a contour of the ground surface upon which the covering is placed, a hose connected to said covering, which hose is adapted to connect onto an exhaust pipe of a combustion engine, and a pressure relief valve which prevents back-up of exhaust gases above a set pressure to return to said engine to prevent engine failure.

3. A device as set forth in claim 2, wherein said covering of pliable material has a central upper portion of rigid material secured thereto to which said hose, said pressure relief valve and a lifting device are secured.

* * * * *